June 21, 1960 E. J. HALL ET AL 2,941,846
TRACTION DRIVE ASSEMBLY
Filed Aug. 27, 1957 2 Sheets-Sheet 2
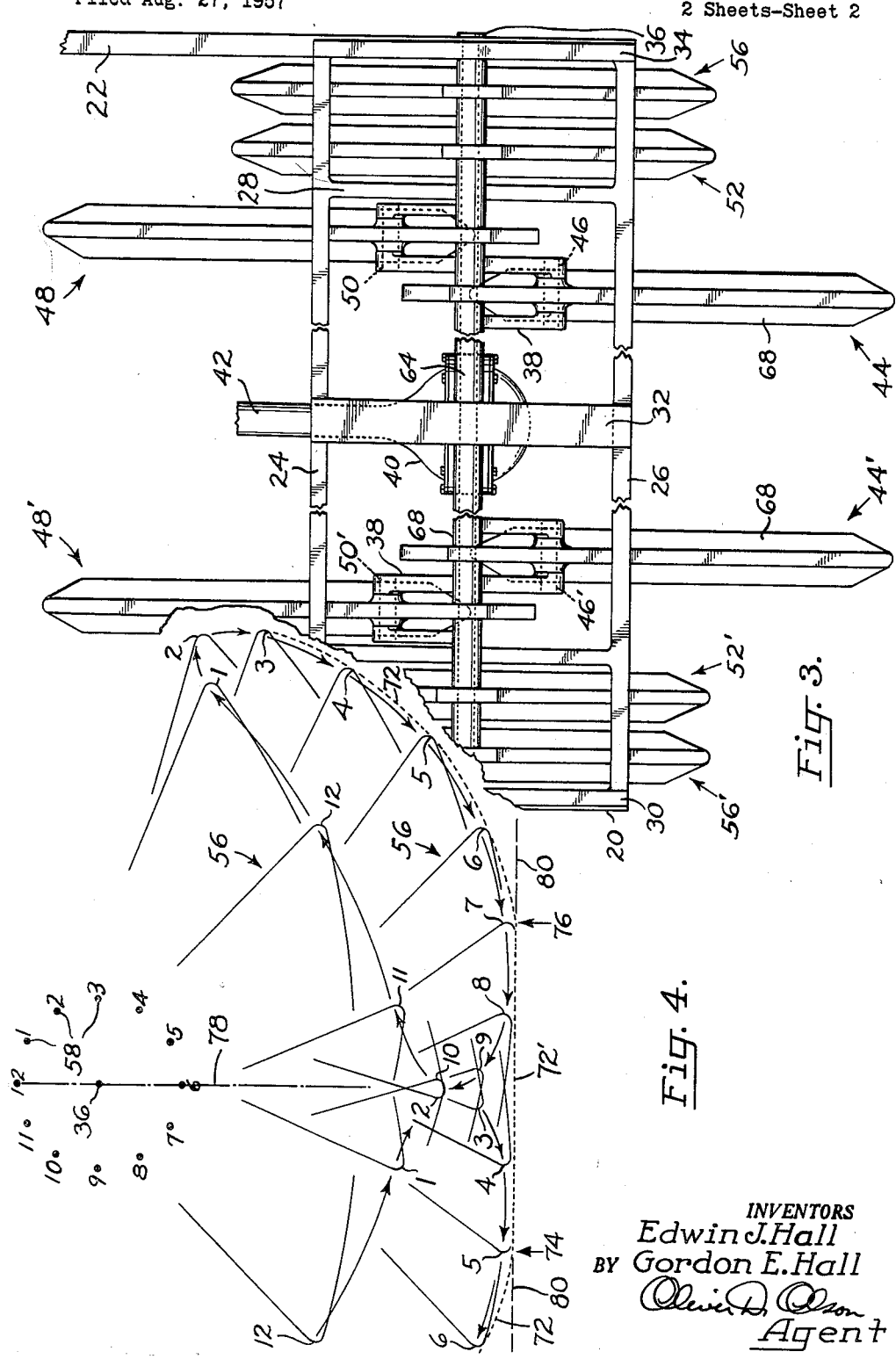
INVENTORS
Edwin J. Hall
BY Gordon E. Hall
Agent

United States Patent Office 2,941,846
Patented June 21, 1960

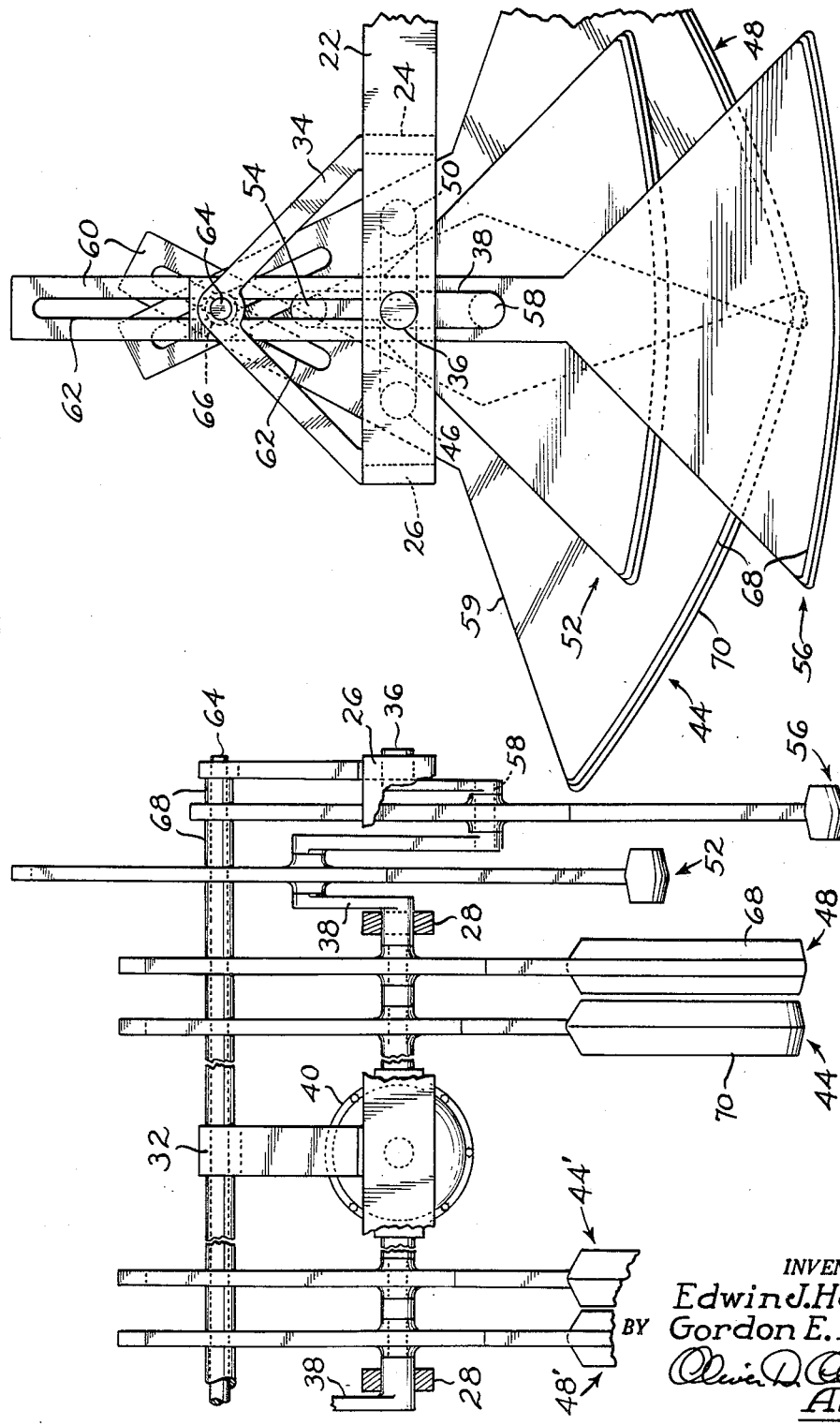

2,941,846
TRACTION DRIVE ASSEMBLY

Edwin J. Hall and Gordon E. Hall, both of 6936 SW. 55th Ave., Portland, Oreg.

Filed Aug. 27, 1957, Ser. No. 680,530

5 Claims. (Cl. 305—1)

This invention pertains to drive systems, and relates particularly to a traction drive assembly for vehicles.

The use of track-laying type drive systems and of large wheeled systems are well known for such types of equipment as tanks, tractors, earth movers, and many others. However, these types of drive systems possess limitations which impair or restrict their use under certain conditions, principally on extremely soft or slippery terrain. This limitation is inherent in such types of systems because they rely for traction upon rotary traction elements of limited diameters. Such rotary elements tend to dig themselves down in soft terrain, rather than to extricate themselves, thereby rendering them impractical under such conditions.

Accordingly, it is a principal object of the present invention to provide a traction drive assembly which overcomes the inherent disadvantage of the drive systems described hereinbefore, and which functions with maximum efficiency on soft and slippery terrains.

Another important object of this invention is the provision of a traction drive assembly which utilizes a stepping action in combination with a rectilinear motion, to assure position travel over soft and slippery terrain.

Still another important object of this invention is to provide a traction drive assembly in which a combined stepping and rectilinear motion is achieved from a rotary power source.

A further important object of the present invention is to provide a traction drive assembly which utilizes a stepwise propelling action and yet maintains a structure supported thereby at a substantially constant distance from the surface supporting the drive assembly.

A still further important object of this invention is the provision of traction drive assembly which is of simplified construction for economical manufacture, which may be of extremely rugged design for heavy duty use, and which involves a minimum of moving parts and hence requires a minimum of maintenance and repair.

Still another object of this invention is to provide a traction drive assembly for vehicles, in which assembly the bearings and other working parts are positioned well above the ground and above the peripheral path of the traction surface, to minimize wear and damage due to dirt.

The foregoing and other objects and advantages of this invention will appear from the following detailed description, taken in connection with the accompanying drawings, in which:

Figure 1 is a fragmentary view in side elevation of a traction drive assembly embodying the features of this invention;

Figure 2 is a foreshortened fragmentary view in end elevation, as viewed from the left in Figure 1, parts thereof being broken away to disclose details of construction;

Figure 3 is a foreshortened plan view of the drive assembly shown in Figure 1; and Figure 4 is a schematic diagram illustrating the path of travel of the traction elements of the drive assembly illustrated in Figure 1.

The basic concept of the present invention involves an assembly of a plurality of traction elements mounted in such a manner upon a frame that when the traction elements are driven the traction surfaces thereof are moved in a stepwise walking action through a peripheral path which includes a substantially straight section lying upon a continuous plane.

Considering the invention in greater detail and referring to the drawings, the traction drive assembly is illustrated therein in conjunction with a frame which may be the frame of a vehicle, such as a tractor or tank. The frame includes longitudinal side members 20, 22, a pair of transverse members 24, 26 stabilized by braces 28, and the transversely spaced longitudinal bridge members 30, 32, 34. The portion of the frame shown in the drawing may for example comprise the rear end of a vehicle frame, the forward end of which may support a conventional drive motor and steering assembly.

Mounted transversely between the side frame members and journaled therein as well as in the intermediate braces is a crankshaft 36 provided with a plurality of transversely spaced throws 38. In the embodiment illustrated the crankshaft is formed in two sections which are interconnected through a conventional differential gear assembly 40 which is driven through a drive shaft 42 from a source of power (not shown). The differential housing is supported from the central bridge frame 32, as illustrated.

It will be understood that the drive assembly of operable without direct power drive. For example, it may be an idling assembly supporting a trailer on the front end of a vehicle which is driven through another assembly.

A plurality of traction members are interconnected with the crankshaft and frame in a manner now to be described, and since in the embodiment illustrated the arrangement of traction members is duplicated symmetrically on opposite sides of the differential, the corresponding parts on opposite sides of the differential are identified by the same reference numerals, with the prime superscript being applied to the reference numerals on one side of the differential to distinguished corresponding parts on opposite sides of the differential.

Thus, the innermost pair of traction members 44, 44' are secured pivotally to the innermost pair of throws of the crankshaft by means of pivot pins 46, 46'; the next adjacent pair of traction members 48, 48' are secured pivotally to the associated pair of throws by means of pins 50, 50'; the next adjacent pair of traction members 52, 52' are pivotally connected to the associated pair of throws by means of pins 54, 54'; and the outermost pair of traction members 56, 56' are pivotally secured to the outermost pair of throws by means of pins 58, 58'. Means such as split bearings may be employed on the throws to mount the pins.

Each traction member includes a foot section 59 and a shank section 60. In the embodiment illustrated the pins which interconnect the traction members and the crankshaft throws are secured in the shank section, as best illustrated in Figure 1. Each of the shank sections is provided with an elongated slot 62 above the said pin. Extending through these slots is a transverse pivot guide shaft 64 which is supported by the bridge members 30, 32, 34. Thus, the guide shaft functions in conjunction with the slots 62 to guide the pivotal mounting of the ends of the traction members during rotation of the crankshaft, as will be more apparent hereinafter. If desired, bearings 66 may be interposed between the shaft and slots to facilitate movement with minimum friction, and spacer sleeves 68 may be interposed on the shaft between adjacent shank sections to prevent lateral displacement of the latter.

The foot sections of the traction members flare downwardly from the shank sections and terminate in an arcuate base flange 68. The under surface of this base flange may be provided with any form of traction surface 70 desired. For example, if the drive assembly is to be incorporated in a vehicle, the base flanges may be provided with traction lugs or tire treads. If the drive assembly is to be utilized for example as a speed changer, the base flange surfaces may be provided either with sprocket teeth or gear teeth adapted to engage a sprocket chain or gear, respectively, having a width at least equal to the width of the drive assembly. Alternatively, the base flanges may be provided with other well known forms of friction surfaces adapted to engage a drive belt of appropriate width.

Certain important features of the present invention are illustrated schematically in Figure 4, wherein the opposite ends of the traction surface of one of the traction members, for example traction member 56, are shown in various positions of travel during rotation of the crankshaft. The twelve positions of the pivot pin 58 on the crankshaft throw are spaced apart circumferentially at 30° intervals and are identified by numerals 1 to 12 which also identify the corresponding positions of the ends of the traction surface.

A particularly important feature of the present invention resides in the fact that each of the traction members is so arranged that the peripheral path 72 which is generated by movement as the crankshaft is rotated, includes a section 72' which is a straight plane. This straight section is identified as extending between points 74 and 76. This section is disposed at a maximum distance vertically below the frame, and is perpendicular to the plane 78 extending through the axes of the crankshaft 36 and pivot guide shaft 64. Since the dimensions of all of the traction members are the same, it will be understood that the straight sections generated by all of the traction surfaces lie in the same plane.

A further important feature of this invention resides in the provision of traction surfaces of sufficient arcuate length, with respect to the number of traction members and crankshaft throws, that there is at all times at least one pair of traction surfaces on the plane of the aforementioned straight sections 72' of the generated paths. Thus, before the traction surfaces of one pair of traction members leave the plane, the traction surfaces of the pair of traction members next succeeding in order of rotation are brought into said plane. Accordingly, when the drive assembly is utilized in a mobile vehicle, the axis of the crankshaft always is maintained at a constant height above the ground, as in the case of conventional wheeled vehicles.

Still another important feature of the present invention resides in the fact that each traction surface passes through the aforementioned straight section 72' at the same rate of speed as its predecessor in rotation. Accordingly, when the drive assembly is incorporated in a mobile vehicle the speed of travel is uniform regardless of which pair of traction surfaces engage the ground. This provides a uniformity of operation similar to conventional wheeled vehicles. When the drive system is employed as a power transfer or speed changer, each succeeding traction surface picks up the drive chain, gear or belt before the preceding traction surface disengages, and the succeeding traction surface continues the drive at the same speed.

To exemplify the foregoing advantageous features, let it be assumed that the drive assembly is being utilized to propel a vehicle toward the right in Figure 4. Thus, it is seen that the left end of the traction surface first engages the straight section 72' of the ground line 80 at the midpoint between the 4 and 5 o'clock positions to the left of the vertical plane 78, and then leaves the straight section 72' at the 5 o'clock position 74. As rotation of the crankshaft continues and the vehicle is propelled toward the right, the point of contact of the traction surface with the ground line moves to the right until, at point 76, the right hand end of the traction surface moves upwardly from the ground line. It will be understood that before this latter action occurs, the left end of the next succeeding traction surface will have come into engagement with the straight section 72' of the ground line, to support the vehicle. Thus, each succeeding traction surface functions to form a continuation of the straight line section extending between the points 74, 76, produced by its predecessor, and accordingly the axis of the crankshaft and hence the frame is maintained at a substantially constant distance above the ground line.

It is to be noted further that the rate of speed of the traction surface through the flat working section defined by the points 74, 76 is substantially constant, and that said rate of speed is slower than the rate of speed with which the traction surface is returned in the elevated position, from left to right. This is indicated by comparison of the spacings between the ends 4, 5, 6 and 7 of the traction surfaces with the spacings between the ends 11, 12, 1 on the return cycle. Thus, it is apparent that the traction surfaces are moved more slowly and with greater power during the working portion of the cycle.

Although the foregoing mode of operation of the drive assembly of this invention may be achieved by various structural arrangements, it is achieved in the illustrated embodiment by virtue of the relationship between the axes of the crankshaft, the throw pivot pins, the pivot guide shaft and the curvature of the traction surfaces. Thus, the distance between the axes of the crankshaft 36 and the guide shaft 64 is twice the distance between the axes of the crankshaft and throw pins 46, 50, 54, 58; the distance between the axis of the throw pin and the associated traction surface 70 midway between the ends of the latter is four times the distance between the axes of the crankshaft and throw pins; and the radius of the arcuate traction surface is $4\pi$ times the distance between the axes of the crankshaft and throw pins. In the embodiment illustrated, the distance between the opposite ends of the traction surface is approximately one-half the radius of curvature. This length provides the straight section illustrated in Figure 4 between the points 74 and 76. The length of this flat section varies in proportion to the length of traction surface and the distance between the axis of the throw pivot pin and the midpoint on the traction surface. In this regard it will be understood that whereas four pairs of traction members are provided in the embodiment illustrated, the number of pairs may be reduced by increasing the length of the traction members.

The foregoing action of the present drive assembly renders the latter ideally suitable for use in heavy duty traction equipment. As the crankshaft is rotated by a power source, each pair of traction members are driven through a cycle in which the traction surfaces are lifted upwardly and forwardly from ground engaging position, then arcuately upward and forward, and then arcuately downward and rearward into ground engaging position. By this stepping action each pair of traction surfaces first is lifted forwardly and then planted upon the surface of the underlying terrain. Since the traction surfaces then move to describe a straight plane section, as distinguished from an arcuate section as generated by a rotating wheel, the effect is similar to the action occurring on the flat section of a track-laying vehicle, i.e. the section of track extending between the forward and rearward track wheels. Thus, the present drive assembly avoids the disadvantages of conventional wheeled vehicles as well as the forward roller section of a track-laying vehicle, both of which tend to dig themselves down into loose terrain. On the other hand, the present drive assembly utilizes the advantageous operation of the flat track section of track-laying vehicles, while providing the additional and important feature of the stepping action during the cycle of movement of the traction members.

A further advantage of the traction drive assembly of this invention resides in the provision of a traction surface of substantial width. Thus, in the embodiment illustrated the effective traction width on each side of the differential 40 extends between the innermost and outermost traction members. Further, by shortening the arcuate length of the traction surfaces to provide minimum overlap during rotation of the crankshaft, the width of the traction surfaces may be increased to overlap each other.

It will be apparent to those skilled in the art that various changes may be made in the size, shape and arrangement of parts and other details of construction described hereinbefore, without departing from the scope and spirit of this invention. Accordingly, it is to be understood that the foregoing description is primarily illustrative of the invention and is not to be considered as limiting the scope thereof.

Having now described our invention and the manner in which the same may be used, what we claim as new and desire to secure by Letters Patent is:

1. A traction drive assembly comprising a frame, a rotary crank shaft mounted on the frame and having an axis of rotation, said crank shaft including a plurality of throws extending radially therefrom, a plurality of traction members each having an elongated shank and an elongated traction surface, a plurality of pivot means each connecting the shank of a traction member directly to the outer end of a throw of the crank shaft and each having an axis spaced from and parallel to the crank shaft axis, pivot guide means on the frame slidably engaging the shanks of the traction members and having a fixed axis spaced from and parallel to the crank shaft axis and pivot means axes, the fixed pivot guide means thereby confining the traction member shanks to pivotal movement on a common fixed axis, the pivot guide means axis being spaced from the crank shaft axis in the direction opposite the traction surfaces, the traction members, pivot means, and pivot guide means being proportioned and arranged in such manner that during rotation of the crankshaft the peripheral path generated by movement of each traction surface includes a substantially straight section perpendicular to a plane extending between the axes of the crankshaft and pivot guide means, with the straight section of the path of each succeeding traction member lying in the same plane and being continuous with its predecessor.

2. The drive assembly of claim 1 wherein the distance between the axes of the crankshaft and pivot guide means is twice the distance between the axes of the crankshaft and pivot means, and the elongated traction surface has a radius $4\pi$ times the distance between the axes of the crankshaft and pivot means.

3. A traction driven assembly for vehicles comprising a frame, a rotary crank shaft mounted on the frame and having an axis of rotation, the crankshaft including a plurality of throws extending radially therefrom, a plurality of traction members each having an elongated shank and an elongated traction surface, a plurality of pivot means each connecting the shank of a traction member directly to the outer end of a throw of the crankshaft and each having an axis spaced from and parallel to the crankshaft axis, pivot guide means on the frame slidably engaging the shanks of the traction members and having a fixed axis spaced above and parallel to the crankshaft axis and pivot means axes, the fixed pivot guide means thereby confining the traction member shanks to pivotal movement on a common fixed axis, the traction members, pivot means, and pivot guide means being proportioned and arranged in such manner that during rotation of the crankshaft and travel of the vehicle along an underlying support, the vertical distance between the crankshaft axis and an underlying support is maintained substantially constant.

4. The drive assembly of claim 3 wherein the distance between the axes of the crankshaft and pivot guide means is twice the distance between the axes of the crankshaft and pivot means, and the elongated traction surface has a radius of $4\pi$ times the distance between the axes of the crankshaft and pivot means.

5. The drive assembly of claim 3 wherein the plurality of traction members includes a plurality of pairs of traction members disposed on opposite sides of a power drive connection to the crankshaft.

References Cited in the file of this patent

UNITED STATES PATENTS

| | | |
|---|---|---|
| 1,041,837 | Miks | Oct. 22, 1912 |
| 1,342,410 | Wachniak | June 1, 1920 |
| 1,511,928 | Zboril | Oct. 14, 1924 |
| 1,682,717 | Corona | Aug. 28, 1928 |
| 2,230,759 | Page | Feb. 4, 1941 |
| 2,290,118 | Page | July 14, 1942 |